(12) United States Patent
Makino et al.

(10) Patent No.: US 9,702,322 B2
(45) Date of Patent: Jul. 11, 2017

(54) VAPORIZED FUEL PROCESSING APPARATUS

(71) Applicant: AISAN KOGYO KABUSHIKI KAISHA, Obu-shi, Aichi-ken (JP)

(72) Inventors: Katsuhiko Makino, Aichi-ken (JP); Osamu Fujimura, Obus (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 0 days.

(21) Appl. No.: 14/855,863

(22) Filed: Sep. 16, 2015

(65) Prior Publication Data

US 2016/0084208 A1    Mar. 24, 2016

(30) Foreign Application Priority Data

Sep. 24, 2014  (JP) ................................. 2014-193419

(51) Int. Cl.
*F02M 25/08*   (2006.01)
*B01D 53/04*   (2006.01)

(52) U.S. Cl.
CPC ..... *F02M 25/0854* (2013.01); *B01D 53/0438* (2013.01); *F02M 25/089* (2013.01); *B01D 2253/102* (2013.01); *B01D 2257/702* (2013.01); *B01D 2259/40096* (2013.01); *B01D 2259/4516* (2013.01)

(58) Field of Classification Search
CPC .......... B01D 53/0407; B01D 2257/708; B01D 2257/702; B01D 2259/4516; F02M 25/0854; F02M 25/089

USPC ............................... 95/146; 96/146; 123/519
See application file for complete search history.

(56) References Cited

U.S. PATENT DOCUMENTS

| | | | | |
|---|---|---|---|---|
| 3,676,986 A * | 7/1972 | Reiling | ..................... | A47L 5/38 15/314 |
| 4,598,686 A * | 7/1986 | Lupoli | ............... | F02M 25/0854 123/519 |
| 6,230,693 B1 * | 5/2001 | Meiller | .............. | F02M 25/0854 123/519 |
| 6,769,415 B2 * | 8/2004 | Reddy | ................ | F02M 25/0854 123/519 |
| 6,896,852 B1 * | 5/2005 | Meiller | .............. | B01D 53/0415 123/519 |
| 8,839,768 B2 | 9/2014 | Kim et al. | | |
| 2002/0078829 A1 * | 6/2002 | Scardino | ................ | B01D 53/02 96/147 |
| 2010/0313763 A1 * | 12/2010 | Lang | .................. | F02M 25/0854 96/126 |
| 2011/0308394 A1 * | 12/2011 | Kim | ................... | F02M 25/0836 96/146 |

(Continued)

FOREIGN PATENT DOCUMENTS

JP    2012-102722 A    5/2012

*Primary Examiner* — Frank Lawrence
(74) *Attorney, Agent, or Firm* — Conley Rose, P.C.

(57) ABSTRACT

A vaporized fuel processing apparatus includes a case and a heating unit removably attached to the case by a twist lock structure. The case has a tank port and a purge port and contains an adsorbent therein. The tank port communicates with a fuel tank. The purge port communicates with an internal combustion engine. The heating unit has an atmospheric port and a heater. The atmospheric port is open to the atmosphere. The heater is disposed between the atmospheric port and the adsorbent.

7 Claims, 9 Drawing Sheets

(56) References Cited

U.S. PATENT DOCUMENTS

2013/0025460 A1* 1/2013 Yamanaka ......... B01D 53/0415
              96/144
2014/0158094 A1* 6/2014 Meiller ................ F02M 27/00
              123/518

* cited by examiner

VAPORIZED FUEL PROCESSING APPARATUS

CROSS-REFERENCE TO RELATED APPLICATIONS

This application claims priority to Japanese patent application serial number 2014-193419, filed Sep. 24, 2014, the contents of which are incorporated herein by reference in their entirety for all purposes.

STATEMENT REGARDING FEDERALLY SPONSORED RESEARCH OR DEVELOPMENT

Not applicable.

BACKGROUND

This disclosure relates to a vaporized fuel processing apparatus mounted on a vehicle such as automobile and configured to adsorb fuel vapor produced from liquid fuel for the vehicle.

The liquid fuel vaporizes in a fuel tank of the vehicle. In order to prevent release of the fuel vapor into the atmosphere, the vehicle is equipped with a vaporized fuel processing apparatus. Because the vaporized fuel processing apparatus contains an adsorbent capable of adsorbing and desorbing the fuel vapor, the vaporized fuel processing apparatus can trap the fuel vapor. Further, Japanese Laid-Open Patent Publication No. 2012-102722 discloses a vaporized fuel processing apparatus having a heater for facilitating desorption of the fuel vapor from the adsorbent.

According to Japanese Laid-Open Patent Publication No. 2012-102722, addition of the heater would make a manufacturing process complicated. In addition, with respect to release of the fuel vapor in a non-purge condition such as stopped state of an internal combustion engine, any countermeasures are not provided. Therefore, there has been a need for an improved vaporized fuel processing apparatus.

BRIEF SUMMARY

In one aspect of this disclosure, a vaporized fuel processing apparatus includes a case and a heating unit removably attached to the case by a twist lock structure. The case has a tank port and a purge port and contains an adsorbent therein. The tank port communicates with a fuel tank. The purge port communicates with an internal combustion engine. The heating unit has an atmospheric port and a heater. The atmospheric port is open to the atmosphere. The heater is disposed between the atmospheric port and the adsorbent.

According to this aspect of the disclosure, when the heating unit breaks down, it may be replaced without having to replace the other components of the vaporized fuel processing apparatus. Further, because the heating unit is removably attached to the case by the twist lock structure, no fixing member, such as a screw, is required, and both attachment of the heating unit to the case and detachment of the heating unit from the case can be easily performed.

In another aspect of this disclosure, a vaporized fuel processing apparatus includes a case and a heater. The case has a tank port, a purge port and an atmospheric port and contains an adsorbent therein. The tank port communicates with a fuel tank. The purge port communicates with an internal combustion engine. The atmospheric port is open to the atmosphere. The heater is disposed between the atmospheric port and the adsorbent and has a diffusion plate. The diffusion plate has a plurality of diffusion holes penetrating therethrough.

According to this aspect, because the heater contains the diffusion plate, an increase in the number of components can be avoided, and manufacturing costs can be decreased. Further, the structure of the vaporized fuel processing apparatus is simplified. In addition, because it is not necessary to separately mount the heater and the diffusion plate, assembly of the vaporized fuel processing apparatus is facilitated.

In another aspect of this disclosure, a vaporized fuel processing apparatus includes a case, a heater and a diffusion plate. The case has a tank port, a purge port and an atmospheric port and contains an adsorbent therein. The tank port communicates with a fuel tank. The purge port communicates with an internal combustion engine. The atmospheric port is open to the atmosphere and defines a flow passage therein. The heater is disposed between the atmospheric port and the adsorbent. The diffusion plate is disposed between the atmospheric port and the adsorbent and has a plurality of diffusion holes penetrating therethrough. The total area of the diffusion holes is equal to or is smaller than the cross-sectional area of the flow passage within the atmospheric port.

According to this aspect, the diffusion plate can restrict release of the fuel vapor into the atmosphere when a purge operation is not being performed. Thus, diurnal breathing loss can be decreased.

In still another aspect of this disclosure, a vaporized fuel processing apparatus includes a case, a heater, a diffusion plate, a terminal and a connector. The case has a tank port, a purge port and an atmospheric port and contains an adsorbent therein. The tank port communicates with a fuel tank. The purge port communicates with an internal combustion engine. The atmospheric port is open to the atmosphere. The heater is disposed between the atmospheric port and the adsorbent. The diffusion plate is disposed between the atmospheric port and the adsorbent and has a plurality of diffusion holes penetrating therethrough. The terminal is connected to the heater and protrudes outwardly from the case. The connector has a tubular wall extending outwardly from the case around the terminal. The tubular wall has a discharging hole penetrating therethrough.

According to this aspect, connector is able to discharge liquid, such as water, from an inner space of the connector through the discharging hole. Thus, corrosion of the terminal can be prevented.

DETAILED DESCRIPTION

Each of the additional features and teachings disclosed above and below may be utilized separately or in conjunction with other features and teachings to provide improved vaporized fuel processing apparatuses. Representative examples, which utilize many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary in the broadest sense, and are instead taught merely to particularly describe representative examples. Moreover, various features of the representative examples and the dependent claims may be combined in ways that are not specifically enumerated in order to provide additional useful embodiments of the present teachings.

Figure 1:
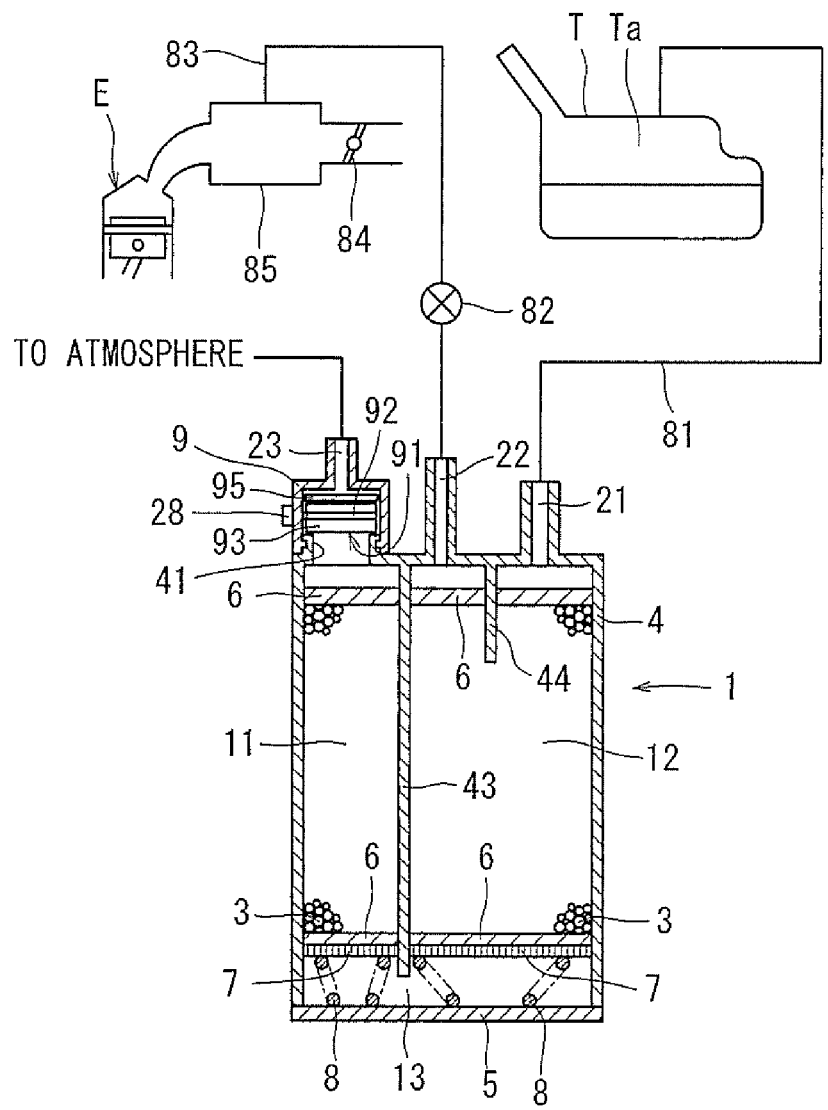
FIG. 1 is a schematic view of a vaporized fuel processing apparatus and its surroundings.

A vaporized fuel processing apparatus 1 is mounted on a vehicle such as automobile. The vaporized fuel processing apparatus 1 is also called as "canister" and contains therein an adsorbent 3, such as activated carbon. As shown in FIG. 1, the vaporized fuel processing apparatus 1 has a tank port 21, a purge port 22 and an atmospheric port 23. The tank port 21 is communicated with an upper gaseous area Ta within a fuel tank T via a fuel vapor passage 81. The purge port 22 is communicated with an internal combustion engine E via an intake passage 83 and an air intake pipe 85. The intake passage 83 is provided with a purge valve 82. The air intake pipe 85 is provided with a throttle valve 84. The atmospheric port 23 is open to the atmosphere.

The vaporized fuel processing apparatus 1 has a case body 4 and a lid 5. The case body 4 is formed in a rectangular cylindrical shape having an open lower end. The lid 5 is configured to close the open lower end of the case body 4. The case body 4 is equipped with the tank port 21 and the purge port 22 and has an opening part 41 communicating with the atmospheric port 23. The case body 4 has a first partition wall 43 extending to a position close to the lid 5 and a second partition wall 44 shorter than the first partition wall 43. An inner surface of the case body 4 and the first partition wall 43 form a U-shaped flow passage within the case body 4 such that the fuel vapor flows from the tank port 21 toward the lid 5 and then flows to the atmospheric port 23. Thus, it is configured that the fuel vapor can easily contact the adsorbent 3 disposed on both sides of the first partition wall 43. The second partition wall 44 divides a space close to both the tank port 21 and the purge port 22 into two areas.

Filters 6 are disposed in the case body 4 in order to hold the adsorbent 3. The filters 6 are made of breathable porous materials such as non-woven cloth or polyurethane foam. The filters 6 are provided on the port sides and the lid side such that the adsorbent 3 is kept between the filters 6. Breathable plates 7 each formed in a lattice shape are provided along the filters 6 on the lid side, and springs 8 are disposed between the breathable plates 7 and the lid 5. The springs 8 can adequately press the breathable plates 7 against the adsorbent 3.

As shown in FIG. 1, the inner surface of the case body 4, the first partition wall 43 and the filters 6 define a first adsorption chamber 11 and a second adsorption chamber 12. The first adsorption chamber 11 is located close to the atmospheric port 23 and is filled with the adsorbent 3. The second adsorption chamber 12 is located close to the tank port 21 and the purge port 22 and is filled with the adsorbent 3. The first adsorption chamber 11 and the second adsorption chamber 12 are communicated with each other via a communication passage 13 defined between the lid 5 and the breathable plates 7. Thus, when gas such as the fuel vapor flows from the first adsorption chamber 11 to the second adsorption chamber 12, the gas must pass through the communication passage 13. Here, the springs 8 pressing the breathable plates 7 are disposed within the communication passage 13.

Flow direction of gas in the vaporized fuel processing apparatus 1 may change depending on pressures in the surroundings connected to the vaporized fuel processing apparatus 1. For example, when the internal combustion engine E is stopped, the fuel vapor flows from the tank port 21 toward the atmospheric port 23. And, the adsorbent 3 housed in the vaporized fuel processing apparatus 1 adsorbs the fuel vapor. On the other hand, when the internal combustion engine E is running, the air flows from the atmospheric port 23 toward the purge port 22. So, the fuel vapor is desorbed from the adsorbent 3 within the vaporized fuel processing apparatus 1.

Figure 2:
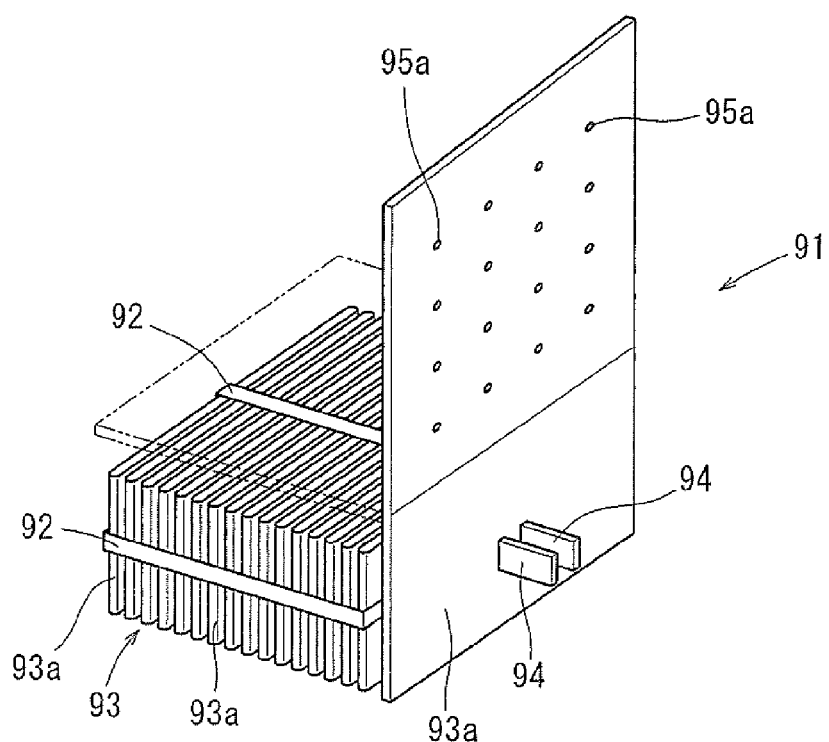
FIG. 2 is a perspective view of a heater.
Figure 3:
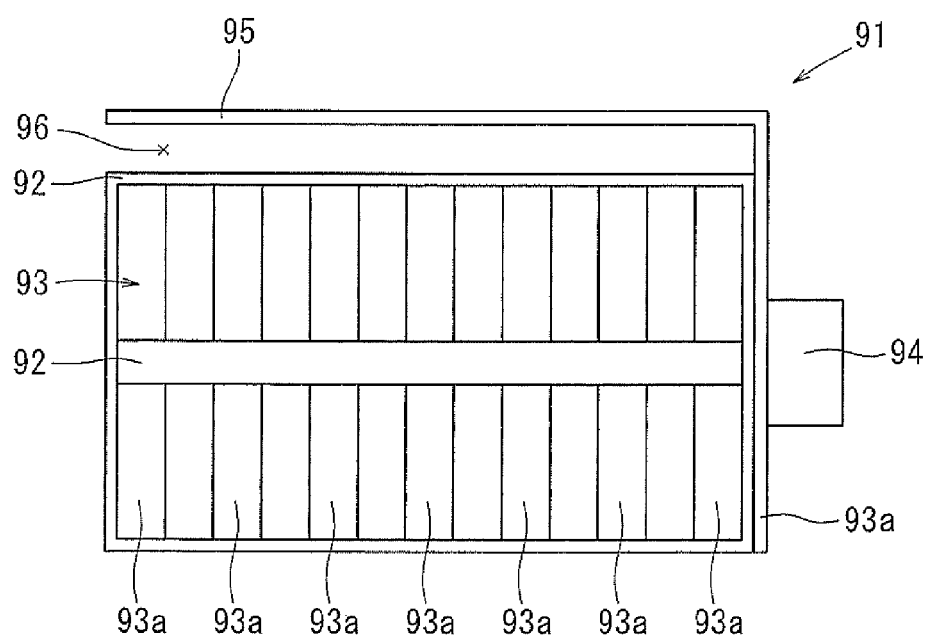
FIG. 3 is a schematic side view of the heater.

The vaporized fuel processing apparatus 1 is detachably provided with a heating unit 9. The heating unit 9 houses a heater 91 therein that is capable of generating heat when provided with a power supply. As shown in FIGS. 2 and 3, the heater 91 has heating elements 92 and a heat radiation portion 93. When heat is transferred to the heat radiation portion 93 from the heating elements 92, the heat radiation portion 93 can radiate heat around the heater 91. The heating elements 92 are connected to a pair of electrodes 94. When the heating elements 92 are supplied with electricity via the electrodes 94 and the like, the heating elements 92 generate heat.

As is best shown in FIG. 2, the heat radiation portion 93 connected to the heating elements 92 is composed of a plurality of heat radiation plates 93a having high thermal conductivity. The heat radiation plates 93a are arranged parallel to each other at regular intervals such that heat radiation plates 93a can radiate heat from the substantial entire surfaces thereof.

Figure 4:
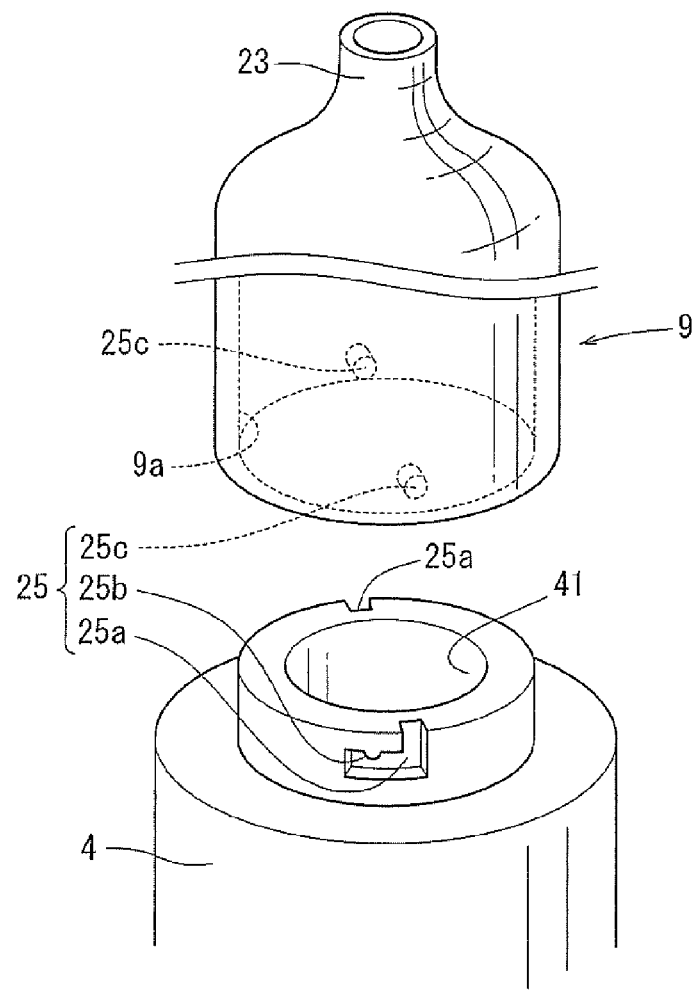
FIG. 4 is a perspective view of a coupling structure between a case body and a heating unit, where the case body and the heating unit are not coupled with each other.
Figure 5:
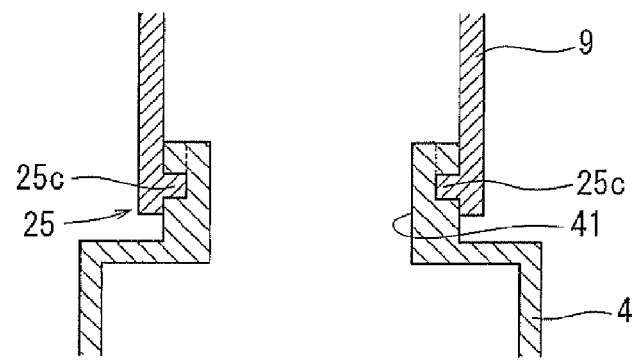
FIG. 5 is a cross-sectional view of the coupling structure between the case body and the heating unit, where the case body and the heating unit are coupled with each other.

Referring now to FIGS. 4 and 5, the heating unit 9 is configured to be attached to the opening part 41 of the case body 4. The heating unit 9 has the atmospheric port 23 and an opening 9a (see FIG. 4) coupled with the opening part 41. Thus, in a state that the heating unit 9 is attached to the case body 4, the air introduced into the heating unit 9 from the atmospheric port 23 can flow into the case body 4 via the opening part 41.

The heating unit 9 is configured to be attached to the case body 4 by only a rotating operation, and the rotational angle of the rotating operation may be less than 360°. The vaporized fuel processing apparatus 1 has a pair of locking mechanisms 25, which prevent reverse rotation of the heating unit 9 after the heating unit 9 is rotated to a predetermined position. As shown in FIGS. 4 and 5, each of the locking mechanisms 25 is composed of a groove 25a, a holding protrusion 25b formed in the groove 25a, and a pin-shaped projection 25c to be inserted into the groove 25a. The opening part 41 of the case body 4 is formed in a hollow cylindrical shape and has a pair of the grooves 25a each formed in a substantial L-shape on an outer circumferential surface of the opening part 41. In each groove 25a, one of the holding protrusions 25b projects downwardly from an upper surface of the groove 25a. A pair of the pin-shaped projections 25c are provided at a lower end of the heating unit 9 such that the pin-shaped projections 25c extend horizontally into the opening 9a. The pin-shaped projections 25c are shaped to be capable of moving through the grooves 25a. When the pin-shaped projections 25c are moved in the grooves 25c toward in a locking direction until the pin-shaped projections 25c go over the holding protrusions 25b, the pin-shaped projections 25c are held by the holding protrusions 25b. Thereafter, the locking mechanisms 25 are able to prevent separation of the heating unit 9 from the case body 4, because the holding protrusions 25b restrict movement of the pin-shaped projections 25c in an un-locking direction opposite to the locking direction.

By inserting the pin-shaped projections 25c into the grooves 25a and then rotating the heating unit 9 with respect to the case body 4 in the locking direction, the pin-shaped projections 25c are caught by the holding protrusions 25b, that is, the heating unit 9 is attached to the case body 4. In this specification, the above-described structure is referred to as a "twist lock structure". That is, the twist lock structure has features that allow transition between an un-locked state and a locked state by rotational operation, and when the twist lock structure is in the locked state, it is able to prevent change from the locked state to the un-locked state.

When the heating unit 9 is rotated in the un-locking direction (i.e., counter clockwise in the embodiment of FIG. 4) opposite to the locking direction (i.e., clockwise in the embodiment FIG. 4), the locked state can be changed to the un-locked state, that is, the pin-shaped projections 25c are released from the holding protrusions 25b. The heating unit 9 and the case body 4 are configured such that the un-locking operation can be performed by a person having a normal power. That is, the heating unit 9 can be attached to the case body 4 by rotating the heating unit 9 in the locking direction by hand, and can be removed from the case body 4 by rotating the heating unit in the un-locking direction by hand. Thus, the heating unit 9 may be easily replaced with a new one. Further, because the rotational angle is less than 360°, work burden can be decreased, and the possibility that the heating unit 9 contacts surrounding members during rotation is reduced. Therefore, the shape of the heating unit 9 is not excessively limited.

Referring again to FIGS. 1-3, the heating unit 9 contains therein a diffusion plate 95 capable of restricting deviation of the flow of gas such as air. The diffusion plate 95 is formed in a plate shape having a plurality of diffusion holes 95a penetrating therethrough. The diffusion plate 95 is disposed between the adsorbent 3 and the atmospheric port 23. Thus, when the air, i.e., purge air, flows into the vaporized fuel processing apparatus 1 from the atmospheric port 23, the air flow can be regulated upstream of the adsorbent 3. Accordingly, heating unit 9 is able to effectively introduce the air toward the adsorbent 3, so that desorption efficiency of the fuel vapor from the adsorbent can be improved.

In this example, the heater 91 is provided with the diffusion plate 95. In detail, a part of the heat radiation portion 93 of the heater 91 serves as the diffusion plate 95.

The diffusion plate 95 is formed by bending one of the heat radiation plates 93a of the heat radiation portion 93 from a first state shown by the solid line in FIG. 2 to a second state shown by the dotted line in FIG. 2. FIG. 3 shows a schematic side view of the heater 91, in which the heat radiation portion 93 is bent. As shown in FIG. 3, there is a space 96 between the diffusion plate 95 and the heating elements 92. Because the space 96 can secure a distance from the diffusion plate 95 to the heating elements 92, it is able to increase a space for heating the air flowing from the atmospheric port 23 toward the heater 91. Further, because the diffusion plate 95 is a part of the heater 91, the diffusion plate 95 and the heater 91 are not required to be separately mounted to the vaporized fuel processing apparatus 1, and assembly of the vaporized fuel processing apparatus 1 can be facilitated. In addition, it is able to easily ensure contact area of the heat radiation portion 93 with the air.

The diffusion holes 95a of the diffusion plate 95 are formed such that the total area of the diffusion holes 95a is equal to or smaller than the cross-sectional area of the flow passage in the atmospheric port 23. In detail, the total area of 16 circles corresponding to the diffusion holes 95a shown in FIG. 2 is smaller than the circular cross-sectional area of the flow passage in the atmospheric port 23 shown in FIG. 1. Thus, the diffusion plate 95 restricts the gas flow, so that it is able to slow the diffusion of the fuel vapor into the atmosphere. That is, the diffusion plate 95 can decrease diffusion of the fuel vapor into the atmosphere when a purge operation is not being performed, and diurnal breathing loss can be decreased.

In this example, because the diffusion plate 95 is positioned between the atmospheric port 23 and the heating elements 92 as shown in FIG. 1, the air introduced from the atmospheric port 23 is regulated by the diffusion plate 95 and then flows to the heating elements 92. Therefore, diffusion plate 95 is able to effectively introduce the air toward the heating elements 92.

Figure 6:
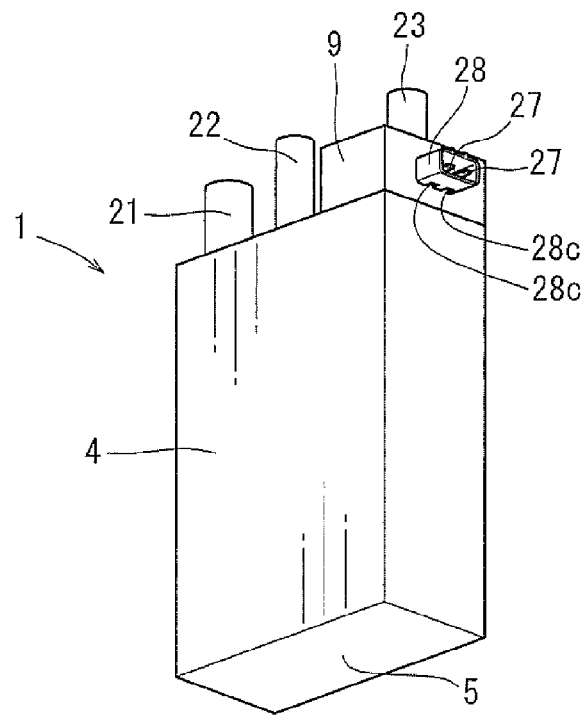
FIG. 6 is a perspective view of the vaporized fuel processing apparatus.
Figure 7:
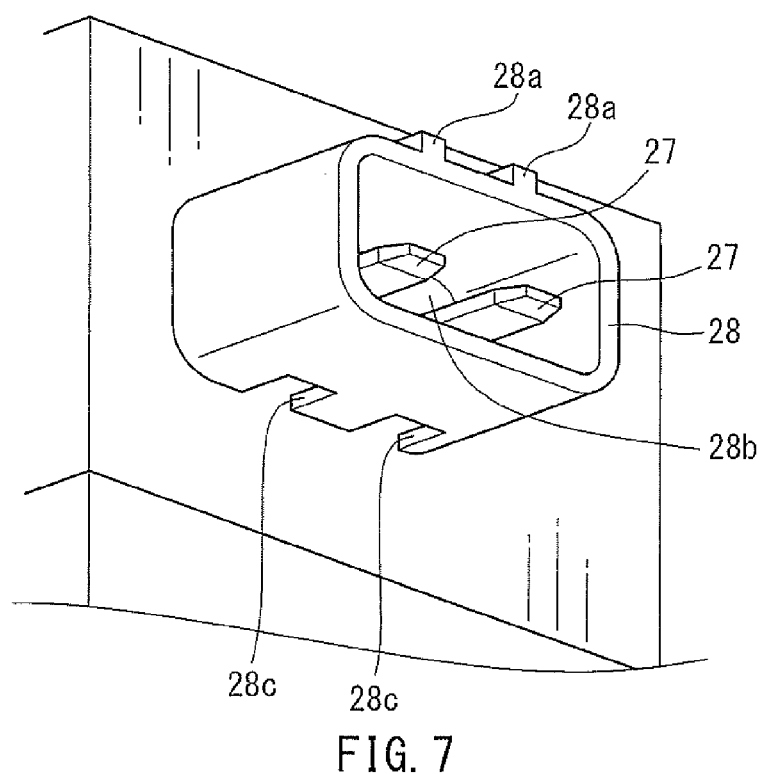
FIG. 7 is an enlarged view of a connector shown in FIG. 6.
Figure 8:
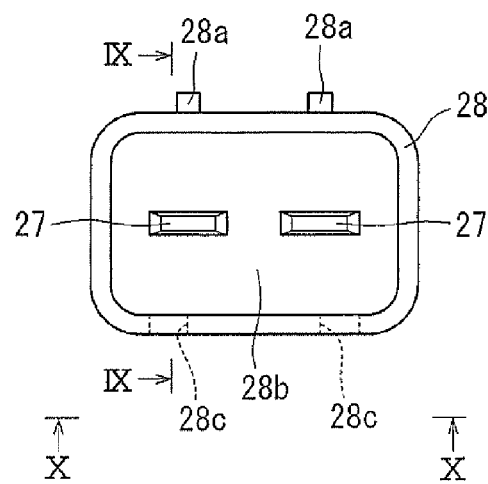
FIG. 8 is a front view of the connector.
Figure 9:
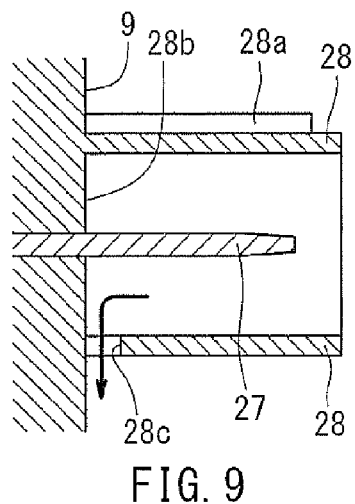
FIG. 9 is a cross-sectional view along line IX-IX shown in FIG. 8.
Figure 10:
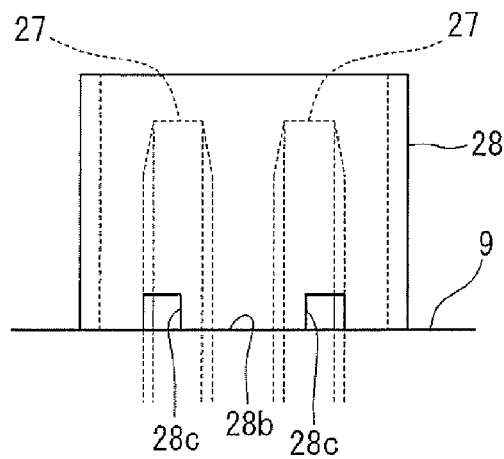
FIG. 10 is a side view of the connector, which is viewed from line X-X shown in FIG. 8.

When the heating elements 92 are supplied with electricity, the heating elements 92 generate heat. The electrodes 94 are connected to terminals 27 (see FIGS. 6 and 7), so that it is necessary to connect the terminals 27 with a lead (not shown) connected to a power supply (not shown) in order to supply the heating elements 92 with electricity. A connector 28 for the terminal 27 and a connector (not shown) for the lead are provided for keeping stable connection between the terminals 27 and the lead (not shown). The connector 28 extends outwardly from an outer surface of the heating unit 9. In detail, as shown in FIG. 6, the connector 28 protrudes from the side surface of the heating unit 9 and is formed in a rectangular cylindrical shape having an open end. A part of each terminal 27, which is formed in a plate shape, is positioned within the connector 28. As shown in FIG. 7, the connector 28 has a pair of projections 28a, which can serve as guide portion when the connector 28 is connected with the connector of the lead.

As shown in FIG. 6, the fuel vapor processing apparatus 1 is configured to be mounted on a vehicle such that the tank port 21, the purge port 22 and the atmospheric port 23 are positioned on the upper side, and that the lid 5 is positioned on the lower side. And, the connector 28 for the terminals 27 is formed such that a center axis of the cylindrical body of the connector 28 extends horizontally as viewed in FIGS. 1 and 6.

When liquid such as water flows into the connector 28, there is a possibility that the liquid corrodes the terminals 27. Thus, the connector 28 has discharging holes 28c for discharging the liquid from the inner space of the connector 28 to the outside as viewed in FIG. 7. The discharging holes 28c penetrate a part of the connector 28.

The positions of the discharging holes 28c can be changed so as to discharge the liquid from the inner space of the connector 28 to the outside. In this example, the discharging holes 28c are formed at a lower wall of the connector 28 as viewed in FIGS. 6-10. In detail, the discharging holes 28c vertically penetrate the lower wall of the connector 28. Accordingly, when the vaporized fuel processing apparatus 1 is mounted on the vehicle, the discharging holes 28c can effectively discharge the liquid from the inner space of the connector 28 to the outside.

Figure 11:
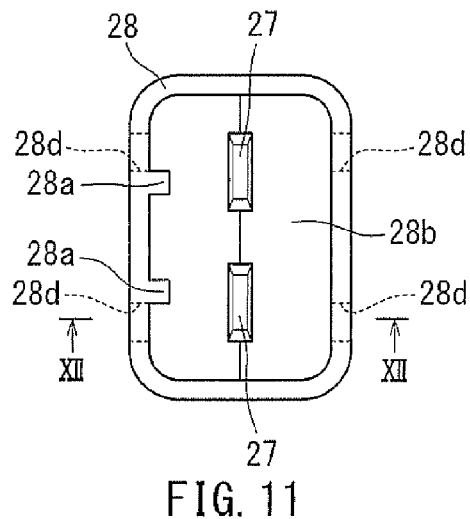
FIG. 11 is a top view of the connector according to a second example.
Figure 12:
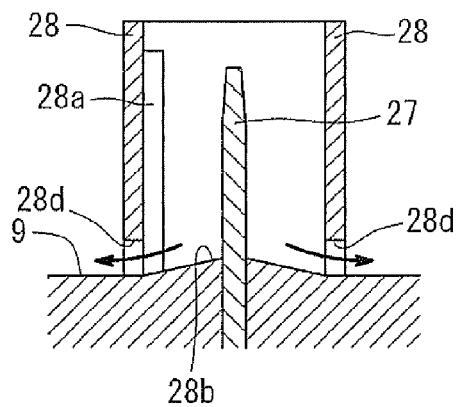
FIG. 12 is a sectional side view along line XII-XII shown in FIG. 11.

Other examples will be described below. Because the vaporized fuel processing apparatuses 1 according to the examples are partially modified, for convenience of explanation, modifications will be described, and the same configurations will not be described again. The position of the connector 28 can be changed. In a second example, the connector 28 is formed in a rectangular cylindrical shape extending upwardly from an upper surface of the heating unit 9 and having an upper open end. That is, the longitudinal direction of both the connector 28 and each terminal 27 is substantially parallel to the longitudinal direction of the atmospheric port 23. In this example, the basal end of the connector 28 is positioned at the lower side of the connector 28. As shown in FIGS. 11 and 12, the connector 28 has the discharging holes 28d at the basal (or base) ends of longer side walls of the connector 28. The connector 28 has a depth surface 28b corresponding to an interior bottom surface opposite to the open end. The depth surface 28b is partially inclined toward the discharging holes 28d in order to facilitate discharge of the liquid from the inner space of the connector 28 through the discharging holes 28. It is preferable that the terminals 27 are positioned at the top of the inclined depth surface 28b such that the liquid hardly contacts the terminals 27. The depth surface 28b can be formed to have a pair of raised area such that the terminals 27 are separately positioned at tops of the raised area of the depth surface 28b.

Figure 13:
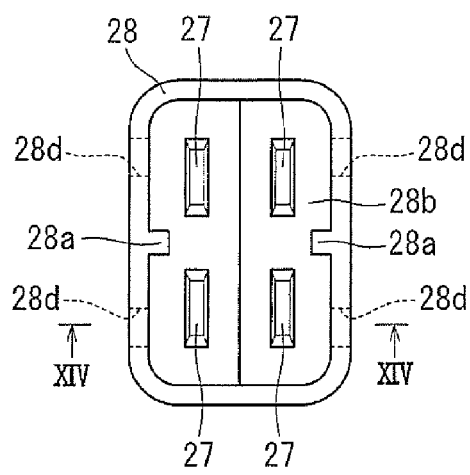
FIG. 13 is a top view of the connector according to a third example.
Figure 14:
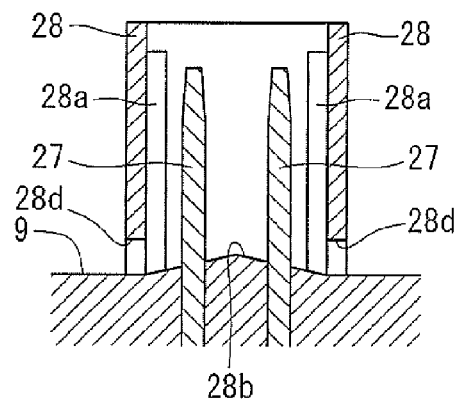
FIG. 14 is a sectional side view along line XIV-XIV shown in FIG. 13.

The number of the terminals 27 can be changed. In a third example, the connector 28 has four terminals 27. The positions of the terminals 27 can be changed, so that, for example, the four terminals 27 may be aligned in a straight line. In this example, the terminals 27 are located at each corner of a square as viewed in FIG. 13 and are not positioned at the top of the depth surface 28b as viewed in FIG. 14.

Figure 15:
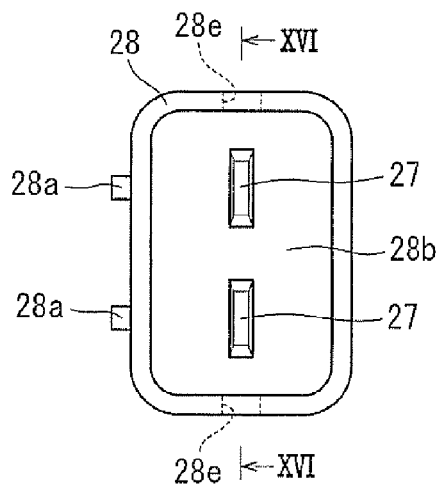
FIG. 15 is a top view of the connector according to a fourth example.
Figure 16:
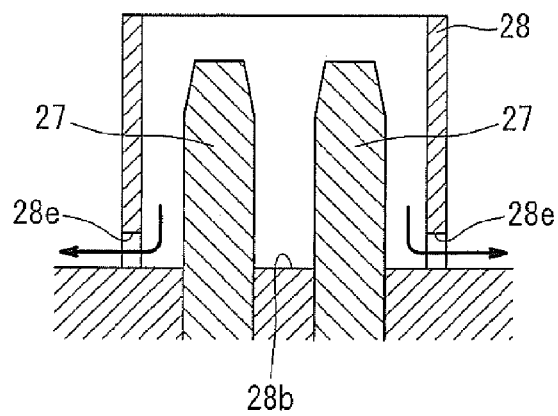
FIG. 16 is a sectional side view along line XVI-XVI shown in FIG. 15.

The positions of the discharging holes 28d can be changed. In a fourth example, the connector 28 has the discharging holes 28e at shorter side walls as viewed in FIGS. 15 and 16. Of course, the discharging holes can be formed at both the shorter side walls and the longer side walls.

Figure 17:
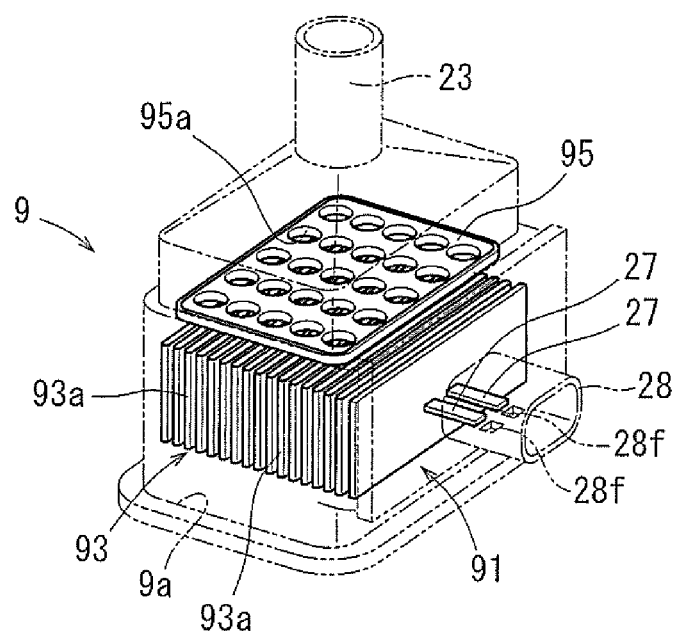
FIG. 17 is a perspective view of the heating unit according to a fifth example.

In a fifth example, the heating unit 9 contains therein the diffusion plate 95 separated from the heater 91 as viewed in FIG. 17. The total area of the diffusion holes 95a can be larger than the cross-sectional area of the flow passage defined in the atmospheric port 23. Further, the heating unit 9 can be configured to be non-detachably attached to the case body 4.

Figure 18:
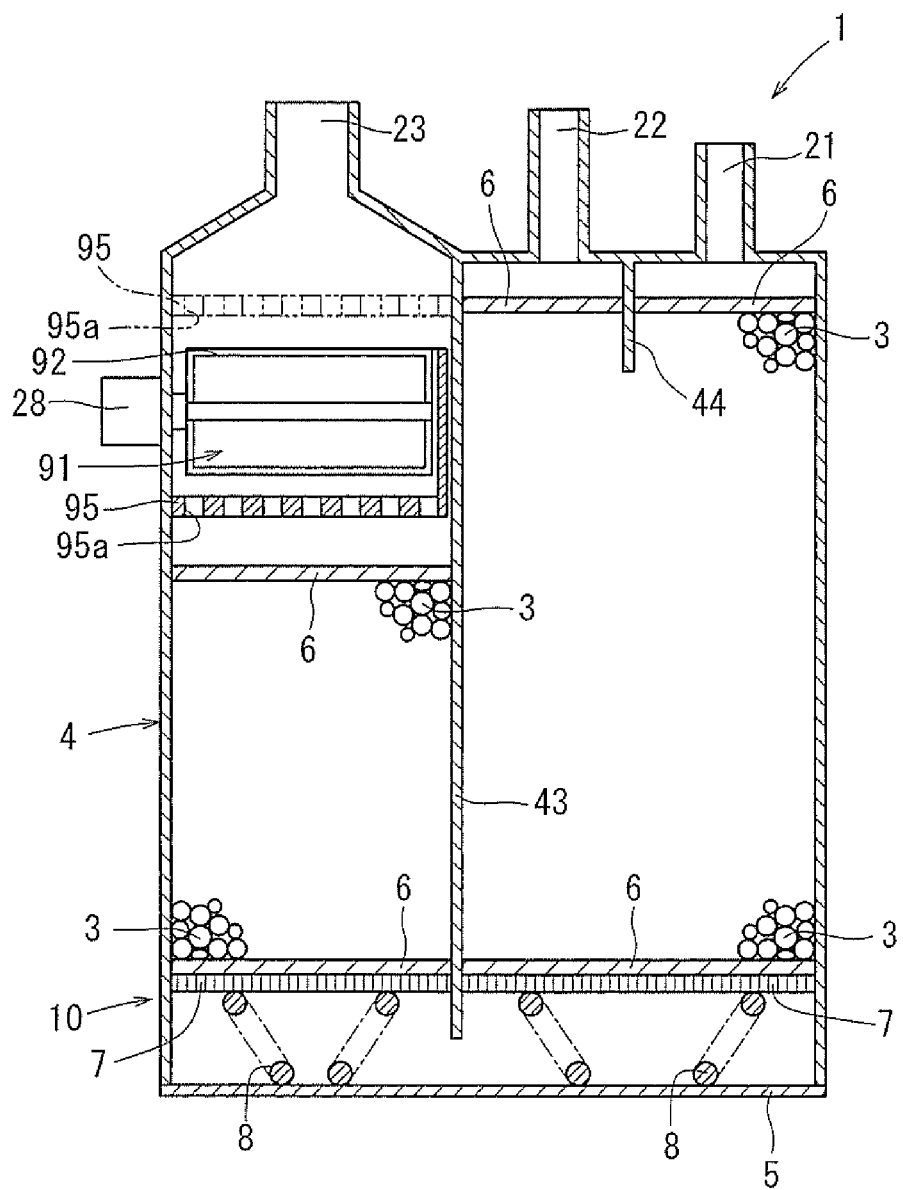
FIG. 18 is a cross-sectional view of the vaporized fuel processing apparatus according to a sixth example.

In a sixth example, the diffusion plate 95 is disposed between the heating elements 92 and the adsorbent 3 as viewed in FIG. 18. Further, the vaporized fuel processing apparatus 1 can have another diffusion plate 95 at a position shown by the dotted line in FIG. 18 such that the heating elements 92 is disposed between a pair of the diffusion plates 95.

Further, the vaporized fuel processing apparatus 1 can be modified without departing from the scope of the invention. For example, the heating unit 9 can be mounted to contact an inward surface of the opening part 41 of the case body 4. The grooves 25a can be formed at the heating unit 9 instead of the case body 4. The total area of the diffusion holes 95a of the diffusion plate 95 can be equal to or smaller than the cross-sectional area of the flow passage defined in the atmospheric port 23 and equal to or smaller than the cross-sectional area of the flow passage defined in the tank port 21. When the heating elements 92 are disposed between the diffusion plates 95, each of the diffusion plates 95 can serve as heat radiation member. In such case, one of the heat radiation plates 93a can be bent such that the heat radiation plate 93a surrounds the heating elements 92. And, two separate heat radiation plates 93a can be bent to form a pair of the diffusion plates 95 above and below the heating elements 92. Further, the vaporized fuel processing apparatus 1 can be mounted on various machines such as airplane, helicopter, ship, submarine, etc.

The invention claimed is:

1. A vaporized fuel processing apparatus comprising:
   a case having a tank port, a purge port and atmospheric port and containing an adsorbent therein, the tank port communicating with a fuel tank, the purge port communicating with an internal combustion engine, the atmospheric port being open to the atmosphere; and
   a heating disposed between the atmospheric port and the adsorbent and having a diffusion plate, the diffusion plate having a plurality of diffusion holes penetrating therethrough;
   wherein the heater has a heat radiation portion, and
   wherein the diffusion plate is a part of the heat radiation portion.

2. The vaporized fuel processing apparatus according to claim 1,
   wherein the heater has a heating element configured to generate heat;
   wherein the diffusion plate includes at least one of a first diffusion plate and a second diffusion plate;
   wherein the first diffusion plate is disposed between the atmospheric port and the heating element; and
   wherein the second diffusion plate is disposed between the heating element and the adsorbent.

3. A vaporized fuel processing apparatus according to claim 1,
   wherein the heat radiation portion is bent to shape the diffusion plate.

4. The vaporized fuel processing apparatus according to claim 1,
   wherein the atmospheric port defines a flow passage therein, and
   wherein a total area of the diffusion holes is equal to or smaller than a cross-sectional area of the flow passage within the atmospheric port.

5. The vaporized fuel processing apparatus comprising:
a case having a tank port a purge port and an atmospheric port and containing an adsorbent therein, the tank port communicating with a fuel tank, the purge port communicating with an internal combustion engine, the atmospheric port being open to the atmosphere;
a heater disposed between the atmospheric port and the adsorbent;
a diffusion plate disposed between the atmospheric port and the adsorbent and having a plurality of diffusion holes penetrating therethrough;
a terminal connected to the heater and protruding outwardly from the case; and
a connector having a tubular wall extending outwardly from the case around the terminal, the tubular wall having a discharging hole penetrating therethrough.

6. The vaporized fuel processing apparatus according to claim 5,
wherein the tubular wall of the connector extends upward when the vaporized fuel processing apparatus is mounted on a vehicle, and
wherein the connector has an inner lower surface inclined toward the discharging hole.

7. The vaporized fuel processing apparatus according to claim 5,
wherein the discharging hole is formed at a lower portion of the tubular wall of the connector when the vaporized fuel processing apparatus is mounted on a vehicle.

\* \* \* \* \*